United States Patent
Schultz

(10) Patent No.: US 10,837,579 B2
(45) Date of Patent: Nov. 17, 2020

(54) PROGRESSIVE FLEX GEOMETRY FOR DISTRIBUTION OF DYNAMIC FORCES WITHIN A HOSE BELLOWS

(71) Applicant: ContiTech Techno-Chemie GmbH, Karben (DE)

(72) Inventor: Joseph P. Schultz, Dover, NH (US)

(73) Assignee: ContiTech Techno-Chemie GmbH, Karben (DE)

( * ) Notice: Subject to any disclaimer, the term of this patent is extended or adjusted under 35 U.S.C. 154(b) by 123 days.

(21) Appl. No.: 16/118,468

(22) Filed: Aug. 31, 2018

(65) Prior Publication Data
US 2020/0072394 A1   Mar. 5, 2020

(51) Int. Cl.
| | |
|---|---|
| *F16L 11/02* | (2006.01) |
| *F16L 11/08* | (2006.01) |
| *B32B 1/08* | (2006.01) |
| *B32B 5/02* | (2006.01) |
| *B32B 25/04* | (2006.01) |
| *F28D 21/00* | (2006.01) |

(52) U.S. Cl.
CPC ............... *F16L 11/02* (2013.01); *B32B 1/08* (2013.01); *B32B 5/024* (2013.01); *B32B 5/026* (2013.01); *B32B 25/042* (2013.01); *F16L 11/085* (2013.01); *B32B 2597/00* (2013.01); *F28D 2021/0082* (2013.01)

(58) Field of Classification Search
CPC . F16L 11/15; F16L 11/11; F01N 13/08; F01N 13/1811; F01N 13/1816
USPC ........................... 138/121, 173; 181/207, 208
See application file for complete search history.

(56) References Cited

U.S. PATENT DOCUMENTS

| | | | | |
|---|---|---|---|---|
| 1,547,431 A | * | 7/1925 | Mallory | F16L 51/04 92/34 |
| 3,626,988 A | * | 12/1971 | Chu | F16L 51/027 138/121 |
| 3,794,080 A | * | 2/1974 | Huston | F16L 11/111 138/121 |
| 4,415,185 A | * | 11/1983 | Vinciguerra | F16L 11/14 285/114 |
| 4,712,642 A | * | 12/1987 | Lalikos | F01N 13/1816 138/121 |
| 5,548,093 A | | 8/1996 | Sato et al. | |
| 5,806,899 A | * | 9/1998 | Norikawa | F01N 13/1816 285/299 |
| 6,830,076 B1 | * | 12/2004 | Patel | F16L 31/00 138/110 |

(Continued)

*Primary Examiner* — Patrick F Brinson
(74) *Attorney, Agent, or Firm* — Gregory Adams; David Cate

(57) ABSTRACT

A charge-air cooler hose includes a hollow cylindrical structure defining an air conduit, an outer surface, and a bellows section, where a plurality of convolutions are formed on the bellows section and the bellows section includes a plurality of ridges and a plurality of valleys. At least one of the plurality of ridges has a diameter and/or shape different from other ridges. In some cases, the bellows section has two ridges. In some other cases, the bellows section has three ridges. Where there are three ridges, each of the three ridges may have a diameter different from one another. In an embodiment where there are three ridges, a first ridge has a diameter D3, a second adjacent ridge has a diameter D4, and a third adjacent ridge has a diameter D5, and where D3<D4<D5.

19 Claims, 3 Drawing Sheets

(56) References Cited

U.S. PATENT DOCUMENTS

| | | | |
|---|---|---|---|
| 9,181,846 B2* | 11/2015 | Kim | F01N 13/08 |
| 2005/0109484 A1 | 5/2005 | Kolb et al. | |
| 2008/0308170 A1* | 12/2008 | Bock | F01N 13/1816 |
| | | | 138/121 |
| 2012/0192986 A1* | 8/2012 | Hagist | F02M 37/0017 |
| | | | 138/121 |
| 2018/0080585 A1 | 3/2018 | Seibold et al. | |

* cited by examiner

PROGRESSIVE FLEX GEOMETRY FOR DISTRIBUTION OF DYNAMIC FORCES WITHIN A HOSE BELLOWS

FIELD

The field to which the disclosure generally relates to are flexible hoses, and in particular flexible hoses for use as a charge-air cooler (CAC) hose, or any suitable flexible structures.

BACKGROUND

This section provides background information to facilitate a better understanding of the various aspects of the disclosure. It should be understood that the statements in this section of this document are to be read in this light, and not as admissions of prior art.

The connection between turbocharger and charge-air cooler (hot side), and the connection between charge-air cooler and the engine air intake manifold (cold side) are mostly achieved by using what are known as charge-air cooler (CAC) hoses, or other flexible ducting. Both the hot side and the cold side here must withstand relatively high pressures, and must also be sufficiently flexible to compensate the relative motion between engine and charge-air cooler. Comparable requirements are also placed upon other hoses, for example industrial hoses, which likewise have to withstand high pressures and varying temperatures.

The current state of the art for flexible CAC hose designs uses a bellows type feature formed into the hose, and restricted from radial expansion with wire rings placed in the valleys of convolutions of the bellows. The purpose of such a hose or other flexible ducting design is to absorb dynamic motion during the operation of the vehicle, as well as to protect other components from damage. The existing style of these designs is to use a series of bellows convolutions, all of which are identical in design, throughout the flexible section of the CAC hose.

However, an observed problem with the current state of the art for flexible CAC hose designs, during the dynamic motion of a full CAC duct assembly, is the CAC hoses do not absorb the dynamic motion evenly over the entire length of the part, and that the flexing may be concentrated at one convolution or towards one end of the CAC hose. This stress concentration can eventually lead to a CAC hose failure due to fatigue.

Thus, there is an ongoing need for CAC hoses having improved flexibility, force distribution and fatigue resistance, such need met, at least in part, with embodiments according to the following disclosure.

SUMMARY

This section provides a general summary of the disclosure, and is not a necessarily a comprehensive disclosure of its full scope or all of its features.

In a first aspect of the disclosure, a charge-air cooler hoses and other flexible ducting include a hollow cylindrical structure defining an air conduit, an outer surface, and a bellows section, where a plurality of convolutions are formed on the bellows section and the bellows section includes a plurality of ridges, which may be any suitable number, and a plurality of valleys, which may also be any suitable number. At least one of the plurality of ridges has a diameter different from other ridges. In some cases, the bellows section has two ridges. In some other cases, the bellows section has three ridges. Where there are three ridges, each of the three ridges may have a diameter different from one another. In an embodiment where there are three ridges, a first ridge has a diameter D3, a second adjacent ridge has a diameter D4, and a third adjacent ridge has a diameter D5, and where D3<D4<D5.

In some embodiments, a wire is disposed upon the surface of the hollow cylindrical structure at each of the plurality of valleys. Furthermore, the hollow cylindrical structure may include a hose-shaped base member, a textile reinforcement arranged to directly contact the surface of the base member, and an outer layer arranged outwardly of the textile reinforcement, wherein the outer layer defines the outer surface of the charge-air cooler hose.

In another aspect of the disclosure, charge-air cooler hoses include a hollow cylindrical structure defining an air conduit, an outer surface, and a bellows section. A plurality of convolutions are formed on the bellows section and the bellows section has three ridges and four valleys, where a first ridge has a diameter D3, a second adjacent ridge has a diameter D4, a third adjacent ridge has a diameter D5, and one of D3, D4 or D5 is different from the others. Diameters may have values where D3<D4<D5, D3=D4<D5, D3<D4=D5, D3<D4>D5, or even D3>D4<D5.

In some cases, the hollow cylindrical structure defines a first distal end and an opposing second distal end, and the first distal end is sealingly connected with a connective adapter. The second opposing distal end may be sealingly connected with a bung. In some embodiments, a wire is disposed upon the surface of the hollow cylindrical structure at each of the four valleys. Additionally, the hollow cylindrical structure may include a hose-shaped base member, a textile reinforcement arranged to directly contact the surface of the base member, and an outer layer arranged outwardly of the textile reinforcement, where the outer layer defines the outer surface of the charge-air cooler hose.

In yet other aspects of the disclosure, a hollow cylindrical structure defines a cavity therein, an outer surface, and a bellows section, where a plurality of convolutions are formed on the bellows section and the bellows section has a plurality of ridges and a plurality of valleys. One of the plurality of ridges has a diameter different from other ridges comprised in the plurality of ridges. In some cases the bellows section has two ridges. In some other cases, the bellows section has three ridges, and each of the three ridges has a diameter different from one another.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
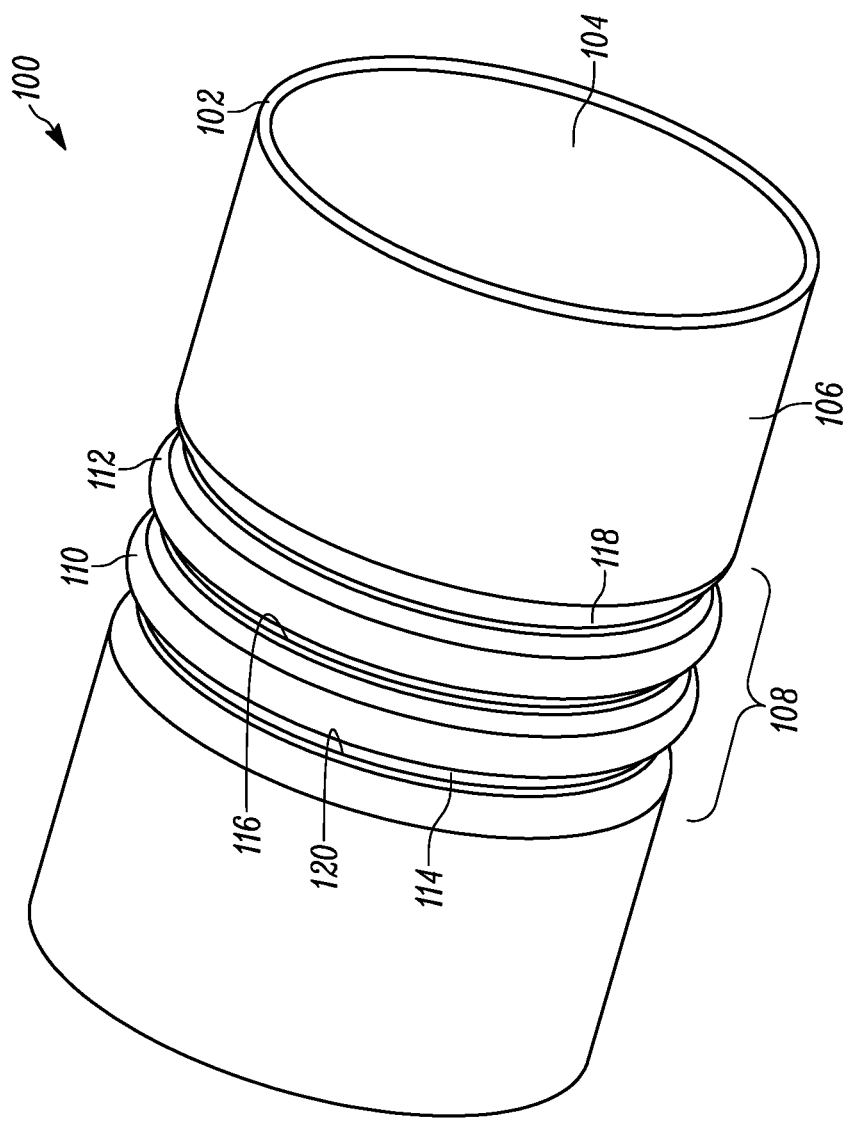
FIG. 1 shows in a perspective view a prior art CAC hose.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the disclosure utilize CAC hose and other flexible plastic ducting designs which provide even distribution of the flexing over the entire length of the hose by altering the geometry of successive convolutions to increase or decrease their flexibility. In some aspects, a hose with progressively greater flexibility in the convolutions of the bellows allow the CAC hoses to more fully distribute the force over its length, and this may result in less stress being placed on a particular section of the hose as well as a longer service life of the CAC hoses, or even the full CAC duct assemblies which contain the CAC hoses as an integral part. This is in contrast to existing CAC hose designs which use a series of bellows convolutions, all of which are identical in design, as shown in FIG. 1.

With reference to FIG. 1, a prior art CAC hose 100 has a hollow structure 102 defining an air conduit 104 within, as well as an outer surface 106. In a bellows section 108, a plurality of convolutions are formed which define ridges 110 and 112, as well as valleys 114, 116 and 118. As can be seen, the convolutions are of identical design and dimension. Further, wires 120 (three shown) are disposed on surface 106 in valleys 114, 116 and 118.

Figure 2:
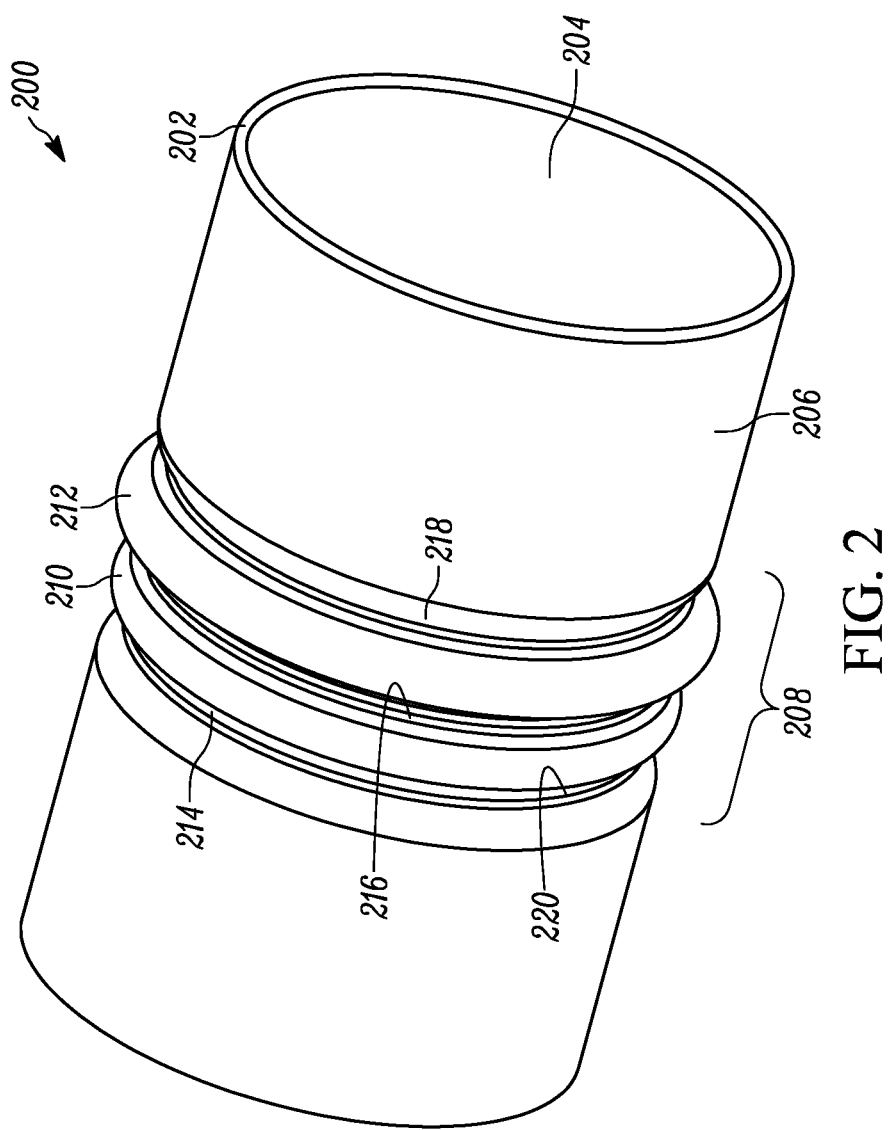
FIG. 2 illustrates in a perspective view a CAC hose embodiment according to the disclosure; and, FIG. 3 depicts in a cross section cut away view, another CAC hose embodiment according to the disclosure.

Now referring to FIG. 2 which depicts one example of a CAC hose in accordance with the disclosure. CAC hose 200 has a hollow structure 202 defining an air conduit 204 and an outer surface 206. Hollow structure 202 is generally cylindrical in shape. In a bellows section 208, a plurality of convolutions are formed which define ridges 210 and 212, as well as valleys 214, 216 and 218. As can be clearly seen, the convolutions are of different dimension as ridge 210 is small and of lower overall diameter in comparison to ridge 212. Additionally, wires 220 (three shown) may optional be disposed on surface 206 in valleys 214, 216 and 218.

A significant advantage provided by the CAC hose designs according to the disclosure, such as that shown in FIG. 2 is a more even distribution of stresses over the CAC hose, and result in a longer service life time of the part. Additionally, the greater ability of the CAC hose to distribute forces may result in a lower overall force transmission through the hose to other system components, thereby reducing fatigue on those components as well.

Figure 3:
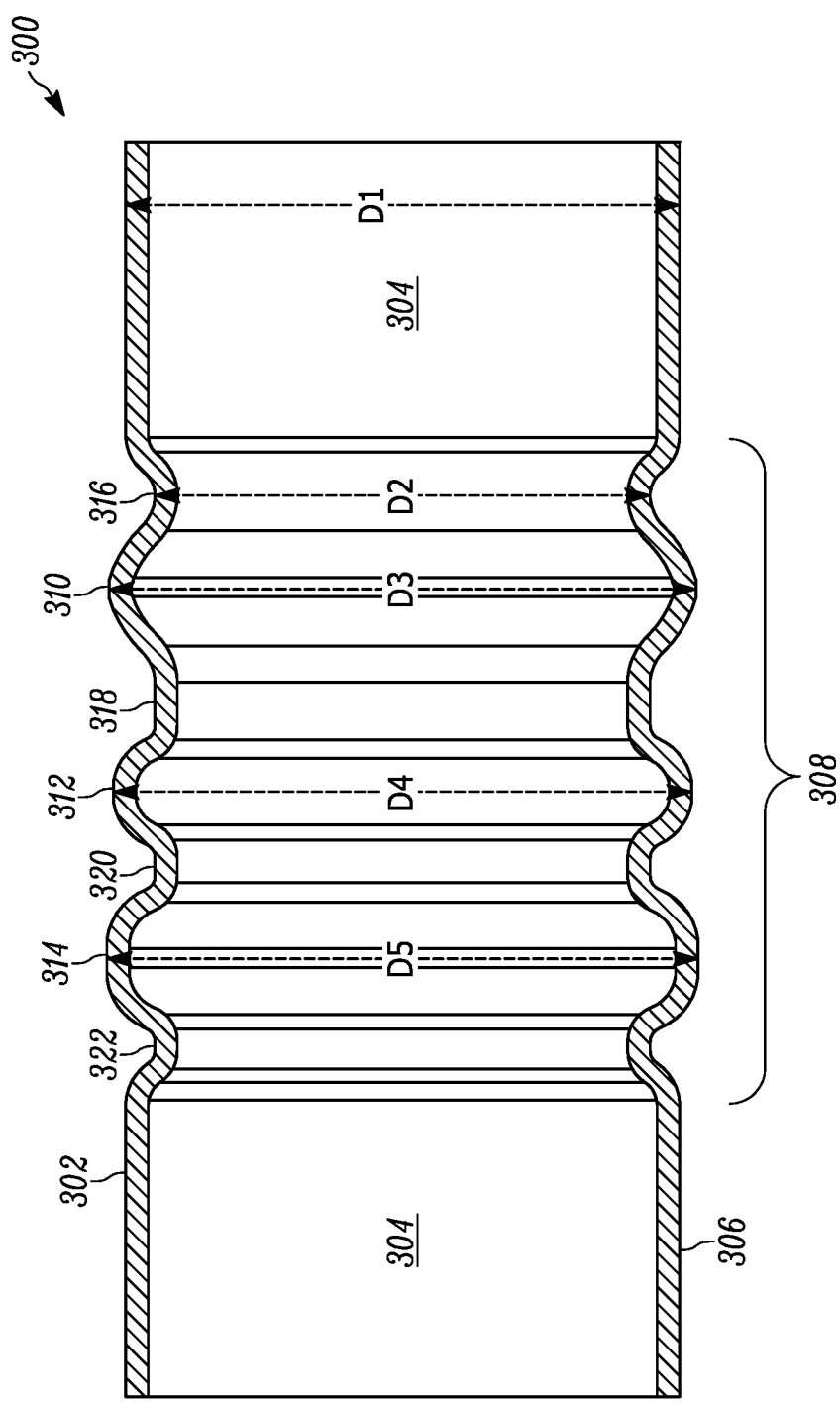

While the embodiment is FIG. 2 shows one example, in some other aspects of the disclosure, the intent is not only to change the diameters, but the entirety of the convolution profile, or geometry itself. The actual shape of the adjacent convolutions may be different from each other in order to modify their flexibility characteristics. FIG. 3 illustrates one such hose embodiment, in a cut away cross section view. Hose 300 has a hollow structure 302 defining an air conduit 304 and an outer surface 306. In a bellows section 308, a plurality of convolutions are formed on outer surface 306 which define ridges 310, 312, and 314, as well as valleys 316, 318, 320 and 322. The convolutions are of different dimensions and shapes, which is clearly depicted by ridges 310, 312, and 314, as well as valleys 316, 318, 320 and 322.

Hollow structure 302 has a general structure diameter D1, which is greater than the diameter D2 at valley 316. Diameter D3 at the peak of ridge 310 is greater than general structure diameter D1, and diameter D4 at the peak of ridge 312 is slightly less than diameter D3 at the peak of ridge 310. Further, diameter D5 at the peak of ridge 314 is greater than diameter D4 at the peak of ridge 312. Further, as can be seen, ridge 310 is of a difference cross-sectional shape than 312 and 314. Such a configuration is only one embodiment of the disclosure.

While D3, D4, and D5 are depicted in one possible order in the design for hollow structure 302, it is within the scope and spirit of the disclosure that any suitable configuration of a plurality of different diameters at the peaks of ridges may be used, as long as at least two of plurality ridge diameters are not identical. For example, in a three ridge design as depicted in FIG. 3, D3, D4 and D5 may all be different dimensions, or two may be of the same dimension while the third is of a different diameter dimension (i.e. D3=D3, while D5 is greater).

In some embodiments, the CAC hoses are wrapped or discretely produced extruded silicone or elastomeric hoses, but not continuously produced or "bulk" hoses. In some cases, the hose may be prepared by extrusion, left completely uncured, then cut to length, formed onto a mandrel and vulcanized as an individual hose.

CAC hoses according to the disclosure may generally include a hose-shaped base member, a textile reinforcement arranged on the surface of the base member, an outer layer arranged outwardly from the textile reinforcement, where the outer layer defines an outer surface of the CAC hose. The combination of the hose-shaped base member, a textile reinforcement arranged on the surface of the base member, an outer layer defined the hollow structure described above. The hose-like base member and outer layer are formed of a vulcanizable, elastomer-containing material. The textile reinforcement is applied onto the base member in non-vulcanized state during a manufacturing process. Due to the non-vulcanized state the elastomers, they are soft. Caused by the soft state of the elastomers and caused by the yarn tension during manufacture of the textile reinforcement and other procedural circumstances, the reinforcement and patch penetrates the elastomers' surface. The contact surface between the elastomers the reinforcement and the abrasion resistant reinforcement patch is therefore three-dimensional. The elastomers enclose the yarns of the reinforcement, and entrain at least the underside of the abrasion resistant reinforcement patch. With such a contact surface and at a dynamical load of the hose, the power transmission between the elastomers, the textile reinforcement and the abrasion resistant reinforcement patch is both non-positive (axially with respect to the yarn) as well as positive (radially with respect to the yarn).

In some embodiments of the invention, the hose-shaped base member is formed as an unvulcanized elastomer hose. The elastomer-containing hose may have a substantially smooth surface. This measure reduces friction between the reinforcement and the base member, which increases life of the hose when being loaded dynamically.

In some embodiments the elastomer-containing hose is manufactured by an extrusion or injection molding process. These manufacturing methods prove to be especially economical in connection with elastomer-containing hoses. Alternatively, the hoses may be built by a wrapping process on a mandrel. The hose may also be built up from rubber coated textile sheets, such as produced by the calendaring process, or other method of coating of a reinforcement textile. In the end, the hose may be vulcanized by many methods, including hot air, autoclave and other molding processes.

In some embodiments of the disclosure, the elastomers used in hose thermoplastic elastomers. By the addition of a thermoplastic elastomer the dynamical and mechanical properties of the hose can specifically be adjusted. In some other aspects of the disclosure, the elastomers used in hose silicone elastomers. In some other embodiments of the disclosure, thermosetting elastomers, or those elastomers with an irreversible cross-linking of the polymer chains, may be used.

In some embodiments, the textile reinforcement is formed from a knitted fabric or as a braid. Any existing or conceivable textile structure can be used or applied in a defined tension state, for the reinforcement. This not only enables the use of charge air hoses for significantly higher pressure ranges than the hoses formerly used in the automotive range, but also enables a controlled volume increase of the hose during operation, which is a significant progress in view of the constantly decreasing space available in the engine compartment. The textile structure is enormously flexible, and the dynamic or mechanical power behavior can be adjusted through the braid angle or extract. The fineness or strength of the yarn is freely selectable according to the respective requirement profile, since compared to an internal reinforcement as in a conventional charge air hose there is no interaction (notch effect) between the reinforcement, the patch, and the matrix. In conventional charge air hoses, the adhesion between the layers additionally plays an essential role. In so far the strength of the yarn is limited. The stronger the yarn the worse the layer bond in the original state. The reinforcement can be applied by a form-fitting weaving-around operation, which is particularly suitable for smooth hoses. The application of a pre-fabricated braid or knitted fabric (e.g. a pre-fabricated braid hose) proves to be an option and is particularly suitable for corrugated hoses.

In some embodiments of the disclosure, the textile reinforcement is made of glass filament. Glass filaments belong to the high-strength yarn materials, they are inexpensive and are characterized by high thermal and chemical resistance and by a very low expansibility.

In some embodiments of the disclosure, the textile reinforcement is formed as a 3D braid or textile. This manufacturing method enables an especially high adaptation to the shape of the base member and thus an especially low relative movement of the textile reinforcement towards the base member when the hose is dynamically loaded. Textiles used may be flat woven or even a three dimensional textile that is produced by stitching together two flat materials to produce a 3D lattice, that has significant thickness.

For some hose embodiments, the textile reinforcement is impregnated and/or coated by a coating material. This protects the reinforcement against wear, e.g. caused by friction. Furthermore, the textile reinforcement is provided in a cut-proof manner and are thereby protected against fraying of the individual filaments. Furthermore, the impregnation or coating of the reinforcement serves for fixing on the hose surface or for assembly adhesion. Furthermore, the yarn filaments are protected in view of the connection (e.g. to a hose by means of hose clamps, couplings, etc.).

In some aspects, the yarn of the textile reinforcement is provided with an impregnation. The impregnation is applied preferably prior to manufacture of the textile reinforcement, i.e. before braiding or knitting. This measure also serves for protecting the yarn, the textile reinforcement against wear. This protection is especially important at the yarn intersecting points of the textile reinforcement which are a weak point with respect to yarn/yarn friction.

The coating material may be a resin or an elastomer, or even a silicone elastomer. The flexible resin or elastomeric coating e.g. in the form of solutions or lattices is a suitable material. When using a textile reinforcement having glass filaments, an adhesion-modified silicon elastomer may be used as coating material, by means of which a universal temperature resistance, high flexibility and favorable adhesion to the glass fiber filaments can be achieved.

In some cases the coating material may be applied by submersion, varnishing or coating of the hose during construction thereof, or by extrusion when braided hoses with later crosslinking are used, since the elastomeric coating material must fundamentally be vulcanized after application, preferably by an online method.

The textile reinforcement may be embedded on at least one hose end into a material adhesively joined with the base member. Also, the hose may be coated at the hose end. This prevents a detachment or fraying of the textile reinforcement and serves for functionalizing the hose ends in view of the connection and integration of functions, e.g. in the clamp seat, clamp fixing, installation marking, etc.

In some aspects, to functionalize the hose ends in view of the connection and integration of functions, e.g. clamp seat, clamp fixing, installation marks, the hose ends can be coated or pre-fabricated caps, such as elastomeric caps, or functionalized, elastomeric hose sections can be adhered and/or vulcanized on.

The above-mentioned features of the invention can arbitrarily be combined with one another.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, and gaps between components may present, for example.

In addition to CAC hoses, the concepts of the disclosure may be applied for any structure that has convolutes or bellows. For example, it could be applied to other types of plastic blow molded tubes and other flexible rubber bellows such as CV joint covers, and the like.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LISTING OF REFERENCE NUMERAL (PART OF THE SPECIFICATION)

100 Prior art CAC hose
102 Hollow structure
104 Air conduit
106 Outer surface
108 Bellows section
110, 112 Ridges
114, 116, 118 Valleys
120 Wires
200, 300 CAC hose
202, 302 Hollow structure
204, 304 Air conduit
206, 306 Outer surface
208, 308 Bellows section
210, 212 Ridges
214, 216, 218 Valleys
220 Wires
310, 312, 314 Ridges
316, 318, 320, 322 Valleys

What is claimed is:

1. A charge-air cooler hose comprising a hollow cylindrical structure defining an air conduit, an outer surface, and a bellows section, wherein a plurality of convolutions are formed on the bellows section and comprise a plurality of ridges and a plurality of valleys, and wherein at least one of the plurality of ridges has a diameter different from other ridges comprised in the plurality of ridges and at least one of the plurality of valleys has a different valley; and
   wherein successive convolutions of the plurality of convolutions have successive geometries configured to provide progressively greater flexibility in the plurality of convolutions of the bellows section, the successive geometries include successive ridge diameters and successive valley diameters.

2. The charge-air cooler hose according to claim 1, wherein a wire is disposed upon the surface of the hollow cylindrical structure at each of the plurality of valleys.

3. The charge-air cooler hose according to claim 1, wherein the hollow cylindrical structure comprises a hose-shaped base member, a textile reinforcement arranged to directly contact the surface of the base member, and an outer layer arranged outwardly of the textile reinforcement, wherein the outer layer defines the outer surface of the charge-air cooler hose.

4. The charge-air cooler hose according to claim 1, wherein the bellows section comprises two ridges.

5. The charge-air cooler hose according to claim 1, wherein the bellows section comprises three ridges and three valleys that form the successive convolutions.

6. The charge-air cooler hose according to claim 5, wherein each of the three ridges has a diameter different from one another.

7. The charge-air cooler hose according to claim 5, wherein a first ridge has a diameter D3, a second adjacent ridge has a diameter D4, and a third adjacent ridge has a diameter D5, and wherein D3<D4<D5.

8. The charge-air cooler hose according to claim 1, wherein at least one of the plurality of ridges has a shape different from at least one other ridge comprised in the plurality of ridges.

9. A charge-air cooler hose comprising a hollow cylindrical structure defining an air conduit, an outer surface, and a bellows section, wherein a plurality of convolutions are formed on the bellows section and comprise a three ridges and four valleys, wherein the three ridges comprise a first ridge having a diameter D3, a second adjacent ridge having a diameter D4, and a third adjacent ridge having a diameter D5, and wherein one of D3, D4 or D5 is different from the others; and wherein successive convolutions of the plurality of convolutions have successive geometries that provide progressively greater flexibility in the plurality of convolutions of the bellows section.

10. The charge-air cooler hose according to claim 9, wherein a wire is disposed upon the surface of the hollow cylindrical structure at each of the four valleys.

11. The charge-air cooler hose according to claim 9, wherein the hollow cylindrical structure comprises a hose-shaped base member, a textile reinforcement arranged to directly contact the surface of the base member, and an outer layer arranged outwardly of the textile reinforcement, wherein the outer layer defines the outer surface of the charge-air cooler hose.

12. The charge-air cooler hose according to claim 9, wherein D3<D4<D5.

13. The charge-air cooler hose according to claim 9, wherein at least one of the ridges has a shape different from at least one other ridge.

14. A hollow cylindrical structure defining a cavity therein, an outer surface, and a bellows section, wherein a plurality of convolutions are formed on the bellows section and comprise a plurality of ridges and a plurality of valleys, and wherein one of the plurality of ridges has a diameter different from other ridges comprised in the plurality of ridges; and wherein successive convolutions of the plurality of convolutions have successive geometries that provide progressively greater flexibility in the plurality of convolutions of the bellows section.

15. The hollow cylindrical structure according to claim 14, wherein the bellows section comprises two ridges.

16. The hollow cylindrical structure according to claim 14, wherein the bellows section comprises three ridges, and wherein each of the three ridges has a diameter different from one another.

17. The charge-air cooler hose according to claim 14, wherein at least one of the plurality of ridges has a shape different from at least one other ridge comprised in the plurality of ridges.

18. The charge-air cooler hose according to claim 9, wherein D3>D4>D5.

19. The charge-air cooler hose of claim 1, wherein the successive geometries are configured to more fully distribute the force over its length mitigate stress.

* * * * *